United States Patent [19]
Hayashi

[11] 3,751,181
[45] Aug. 7, 1973

[54] FAN FOR COOLING AUTOMOTIVE VEHICLE ENGINE

[75] Inventor: Masaharu Hayashi, Ichinomiya, Japan

[73] Assignee: Aisin Seiki Kabushiki Kaisha, Kariya City, Aichi Pref., Japan

[22] Filed: Jan. 28, 1971

[21] Appl. No.: 110,553

[30] Foreign Application Priority Data
Jan. 31, 1970  Japan .............. 45/10347

[52] U.S. Cl. ............ 416/132, 416/229, 416/240, 416/241
[51] Int. Cl. ............................... F01d 5/28
[58] Field of Search .............. 416/132, 240, 241 A, 416/230, 224, 229

[56] References Cited
UNITED STATES PATENTS

| | | | |
|---|---|---|---|
| 2,115,997 | 5/1938 | Morse | 416/185 |
| 2,251,887 | 8/1941 | Larsh | 416/229 |
| 3,136,370 | 6/1964 | Carlson | 416/229 |
| 3,256,939 | 6/1966 | Novak | 416/241 A UX |
| 3,260,312 | 7/1966 | Elmer | 416/241 A X |
| 3,318,388 | 5/1967 | Bihlmire | 416/134 UX |
| 3,551,070 | 12/1970 | Glucksman | 416/229 X |
| 3,584,969 | 6/1971 | Aiki | 416/240 X |
| 3,033,293 | 5/1962 | Bihlmire | 416/241 X |
| 3,237,697 | 3/1966 | Ford et al. | 416/226 |
| 3,241,493 | 3/1966 | Frey | 416/241 X |

FOREIGN PATENTS OR APPLICATIONS

| | | | |
|---|---|---|---|
| 1,327,385 | 4/1963 | France | 416/185 |
| 1,105,208 | 6/1955 | France | 416/229 |

*Primary Examiner*—Everette A. Powell, Jr.
*Attorney*—Pierce, Scheffler & Parker

[57] ABSTRACT

A fan adapted for cooling the automotive vehicle engines and formed of molded plastic material, comprising hub portion and blades securely attached thereto, said blades being formed of thermoplastic material whereas said hub portion being formed of relatively stiff fiber reinforced thermoset plastic material, arms extending from the hub portion into the corresponding blades to form insert members, said thermoplastic material of which the blades are formed extending from the hub portion to cover the arms extending from the hub portion, and holes formed in the arms and the hub portion to provide a firm bond for the thermoplastic material.

3 Claims, 3 Drawing Figures

Fig. 1
Fig. 2
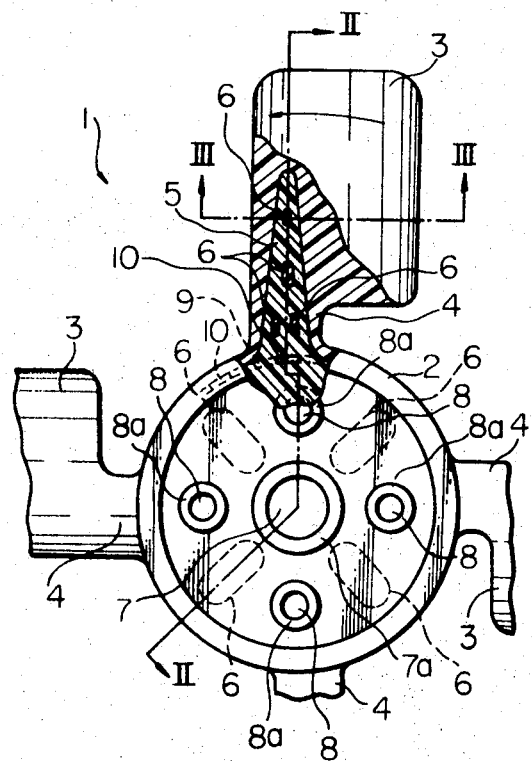
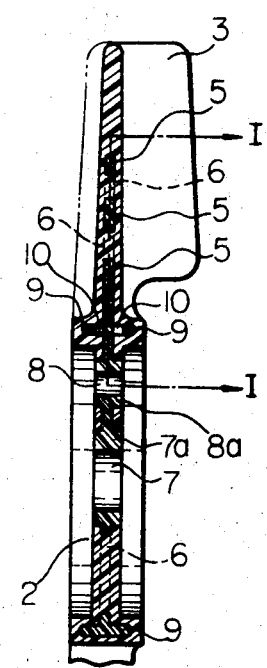
Fig. 3
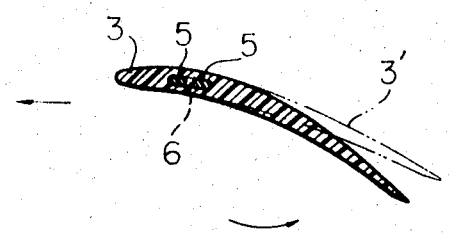
INVENTOR
Masaharu Hayashi
BY Pierre, Scheffler & Parker
ATTORNEYS

FAN FOR COOLING AUTOMOTIVE VEHICLE ENGINE

BACKGROUND OF THE INVENTION

This invention relates to a fan of the flexible multi-blade type, and particularly to the same formed of molded plastic material.

It has heretofore been known in the art that the plastic fan is advantageously employed on automotive vehicle engines for the purpose of provision of flexible blades on a hub which tend to flatten against an imaginary plane perpendicular to the axis of rotation of the fan upon an increase in speed due to centrifugal force and the resistance of the air, to thereby substantially reduce the air flow and the horsepower requirement. As a result, the vehicle is run more efficiently and with a substantial reduction in fan noise.

However, there are difficulties in a plastic fan particularly under ambient conditions usually expected at high temperatures, owing to its undesirable reduction of stress and rigidity. To overcome this deficiency, a metallic insert has heretofore been used for reinforcing the plastic fan as ordinarily used in the plastic art. However, the large differentials in thermal expansion rate between the metallic insert and the plastic material effect the known cracking of the plastic material at a certain condition at high temperature. This deficiency is considered as a great disadvantage and short-coming in practice, in that the fan employed on automotive engines is usually operated in ambient conditions at high temperatures such as exist in a flow of heated air through the radiator or in a combined application with known fluid couplings which will produce heat during operation.

The present invention overcomes these difficulties by providing flexible thermoplastic blades securely attached to and reinforced by a hub portion and its extending arms formed of relatively stiff fiber reinforced plastic material such as phenolic resins, melamine resins, and epoxy resin types. It should be noted, however, that the invention is not limited to the material from which the hub portion and its extending arms are formed as any of the suitable plastic materials known and available to the art may be used.

SUMMARY OF THE INVENTION

It is the most important object of the present invention to provide a fan formed of molded plastic material to form a single unit.

Another important object of the invention is the provision of a molded plastic fan which is advantageous in substantially reduced manufacturing costs.

With these and other objects in view, the plastic fan of the present invention is formed by a hub portion and blades securely attached thereto. The blades are formed of the usual thermoplastic material whereas the hub portion and its extending arms are formed of relatively stiff fiber reinforced plastic material. The hub portion radially extends its arms into corresponding blades as the insert member, each of said arms being provided with holes through which said thermoplastic material of which the blades are formed penetrates to provide a firm connection of the blades with the hub portion. The hub portion is further provided with a rib or rim at its periphery parallel with the axis of rotation of the fan, said rim being formed with radial hole means through which said thermoplastic material of which the blades are formed also penetrates to provide a similar firm connection as described above. Each blade is curved backwardly away from an imaginary plane perpendicular to the axis of rotation of the fan.

Other objects and features of novelty of the invention will be specifically pointed out or will become apparent when referring, for a better understanding of the invention, to the following description taken in conjunction with the accompanying drawings, wherein:

BRIEF DESCRIPTION OF THE DRAWING

FIG. 1 is a plan view of a fan embodying features of the present invention, being partially cut away and partially sectioned along the line I—I of FIG. 2;

FIG. 2 is a sectional view taken along the line II—II of FIG. 1, and

FIG. 3 is a sectional view taken along the line III—III of FIG. 1.

DESCRIPTION OF THE PREFERRED EMBODIMENT

Referring to FIG. 1, a four-bladed fan broadly designated by the reference character 1 is formed of molded plastic material. The fan comprises a hub portion or boss 2 and four flexible blades 3. Each of the blades is so reduced at its bottom 4 just adjacent to the periphery of the hub portion 2 that the torsibility and flexibility of the blade will together allow the blade to tend to flatten against an imaginary plane perpendicular to the axis of rotation of the fan according to an increasing degree of speed due to centrifugal force and the resistance of the air, to thereby substantially reduce the air flow and the horsepower requirement. As a result, the vehicle is run more efficiently and with a substantial reduction in fan noise. Such design is very important in obtaining the required results. The blade swings, when the fan rotates in the direction indicated by the arrow in FIG. 1, from the position shown in heavy line in FIG. 3 to the broken line position 3' as it is deflected by centrifugal force and that of the contacting air as the speed of the fan is increased. Thus, by selecting the proper shape and curvature of the blade and its resistance to deflection, the air flow may be maintained substantially constant, thereby reducing the horsepower requirement as the speed of rotation of the fan is increased.

A fan of this type will have special applications on an automotive engine as a substantial flow of air is required when the engine is idling or driving the vehicle at low speed, which requirement progressively reduces as the speed of the vehicle increases. If the same amount of air is propelled by the blades of the fan at high speed, a substantial amount of horsepower is required, resulting in inefficient operation of the vehicle. With the flexible type of fan as herein illustrated, the increased speed will progressively flatten the blade from its position as illustrated in heavy line in FIG. 3 to the position 3' illustrated in dot and dash line. The blades will be further flattened to an increasing degree of speed according to the rotation of the fan. Thus, when a substantial amount of air is required at low speed, the blades will maintain their initial form and produce a maximum flow of air. As the speed increases, requiring a lesser amount of air, the blades will flatten and produce a relative decrease in air flow which thereby decreases the horsepower requirement and the noise which would be increased if the flow of air were increased.

The fan formed of the thermoplastic material, such as nylon and polypropylene types, inherently possesses excellent properties to meet the above described requirement of the flexible fan, particularly in obviating the fan noise, but it has upon the other hand some difficulties as compared with the metallic fan ordinarily used in the art. The primary difficulty is that the rigidity of the thermoplastic fan will undesirably decrease to an increasing degree at high temperatures usually expected in the flow of air past the radiator. Such high temperatures are further expected when the fan is used in combination with known fluid couplings secured on a driving device. A second difficulty is decrease of stress at high temperatures.

To overcome these difficulties, the present invention provides a plastic fan formed in a manner such that will be specifically described hereinafter.

The blades 3 are formed of the thermoplastic material such as mentioned above whereas the hub portion and its extending arms are formed of relatively stiff thermoset fiber reinforced plastic material such as previously mentioned. The arms are formed integrally with the hub portion 2 and extend into corresponding blades to function as insert members as shown and indicated by the reference character 5 in FIG. 1 and FIG. 2. The hub portion 2 is substantially covered by the thermoplastic material of the blades 3, but is exposed at its reinforcing circular rib 7a around a central aperture 7 which locates the fan 1 accurately on a central stud when provided on the driving device. The hub portion 2 is further formed so as to be exposed at the rib 8a around each of the other apertures 8 provided for otherwise securing the hub portion to a driving pulley or the fluid coupling by means of bolt extending therethrough. This provides means for preventing the hub portion 2 from becoming unsecured which would occur due to known creep of the thermoplastic material usually expected in a condition at high temperatures. The periphery of the hub portion extends parallel with the axis of rotation of the fan to form a rib or rim 9. The hub portion is thus formed by the center aperture 7, rib 7a around which a flange-like portion of relatively lesser thickness extends radially, and rim 9 from which the arms 5 extend radially outwardly. The rim 9 and the ribs 7a and 8a effect a reinforcement of the hub portion 2. As will be seen in FIG. 1 and FIG. 2, the rim 9 is radially perforated as designated by the reference character 10. The perforations 10 provide additional means to firmly connect the thermoplastic material of the blades to the thermoset material of the hub portion 2, the thermoplastic material penetrating through the holes 10. In the cross section in FIG. 1, the cross hatching is not shown within the space of the hole 10 so as to avoid confusion. At suitable positions on the arms 5 and the flange-like portion of the hub portion 2, there are provided additional openings or holes 6 through which the thermoplastic material of the blades penetrates. The function of the holes 6 is the same as described above. The section line I—I in FIG. 2 passes across the space of the hole 10 positioned at the left side of the arm 5, whereas within the other spaces the section line runs along the central axis of the arm 5. Within the spaces of the holes 10 in FIG. 2, the hatching is not shown to avoid confusion, the thermoplastic material of the blades filling the spaces.

As hereinbefore described, the fan according to the invention is reinforced by means of the insert member formed by the hub portion 2 and arms 5 integrally extending therefrom. The holes 10 formed in the rim 9 and holes 6 formed in the arms 5 and in the flange-like portion of the hub portion 2 provide means to firmly connect the thermoplastic material of which the blades are formed and the fiber reinforced thermoset plastic material of which the hub and insert member is formed.

The known cracking of the thermoplastic material of which the blades are formed due to thermal expansion differentials is virtually eliminated by the use of the insert member of the invention, as the difference of the thermal expansion rate is between the thermoplastic and the thermoset plastic is insignificant.

The rolling of the blades is suitably prevented and unnecessary deflection of the blades or localized bending is prevented, whereby the fatiguing of the blades is prevented. In actual use, when employing a fan as herein described, the flow of air is proportional to the speed up to a first predetermined level of speed of rotation of the fan and thereafter the flow of air proportionately decreases as the speed increases from the first level to a second predetermined level after which the flow approaches a constant up to a third level of speed of rotation.

The fan of the present invention has many advantages, primarily the substantial saving in manufacturing costs which can be achieved by the use of the plastic hub portion and the arms extending therefrom as herein described. The hub portion and its arms may be produced through a simpler method of plastic molding technique than is experienced in manufacturing the metallic insert member by metal working. A second advantage is the increase in efficiency of the vehicle operation due to the decrease in the flow of air resulting from the flattening of the blades. This, on the other hand reduces the noise which is controlled by the different angular position of the blades. The provision of the reduced bottom portion 4 of the blade will effect a suitable torsibility of the blade which will present the desired rolling of the blade in cooperation with the resiliency of the blade, since the degree of deflection of any point of the blade with respect to the hub portion is completely controlled. By controlling the resiliency of the blade, the degree of flattening of the blade may also be controlled at a predetermined speed of rotation and a maximum flow of air may be maintained up to a predetermined speed, as is normally desired, thus the air flow required is maintained by the movement of the vehicle at an increased speed.

What is claimed is:

1. A multiblade flexible fan for cooling automotive vehicle engines comprising a fan member having a boss and a plurality of integral blades extending radially therefrom, said fan member being formed of molded thermoplastic material, and a hub member having integral insert members extending radially therefrom, and embedded in said blades adjacent the leading edges of said blades, said hub member and insert members being formed of reinforced plastic material, said hub member being provided with a peripheral rim extending parallel to the axis of rotation of the fan, said rim having a plurality of holes therethrough for receiving the thermoplastic material of the boss of the fan member when folded thereon to securely bond the fan member thereto, and said insert members being provided with holes therethrough for receiving the thermoplastic material of the blades when molded thereon to securely bond each blade to its associated insert member, whereby the trailing portions of the blades may flex about an axis at right angles to the axis of rotation of said fan to reduce the pitch thereof in accordance with centrifugal force caused by the speed of rotation of said fan.

2. A multiblade flexible fan as claimed in claim 1 wherein the base portion of each blade is reduced in cross section to improve flexibility of the trailing portions of said blades.

3. A multiblade flexible fan as claimed in claim 1 wherein said reinforced plastic material is fiber reinforced.

* * * * *

UNITED STATES PATENT OFFICE
CERTIFICATE OF CORRECTION

Patent No. 3,751,181      Dated August 7, 1973

Inventor(s) MASAHARU HAYASHI

It is certified that error appears in the above-identified patent and that said Letters Patent are hereby corrected as shown below:

Claim 1, line 14, cancel "folded" and insert

-- molded --

Cancel lines 20-23 and insert:

-- to reduce the pitch thereof and thus reduce the quantity of air delivered by the fan in accordance with the rotational speed of the fan. --

Signed and sealed this 20th day of November 1973.

(SEAL)
Attest:

EDWARD M. FLETCHER, JR.　　　　　RENE D. TEGTMEYER
Attesting Officer　　　　　　　　Acting Commissioner of Patents